Patented July 17, 1928.

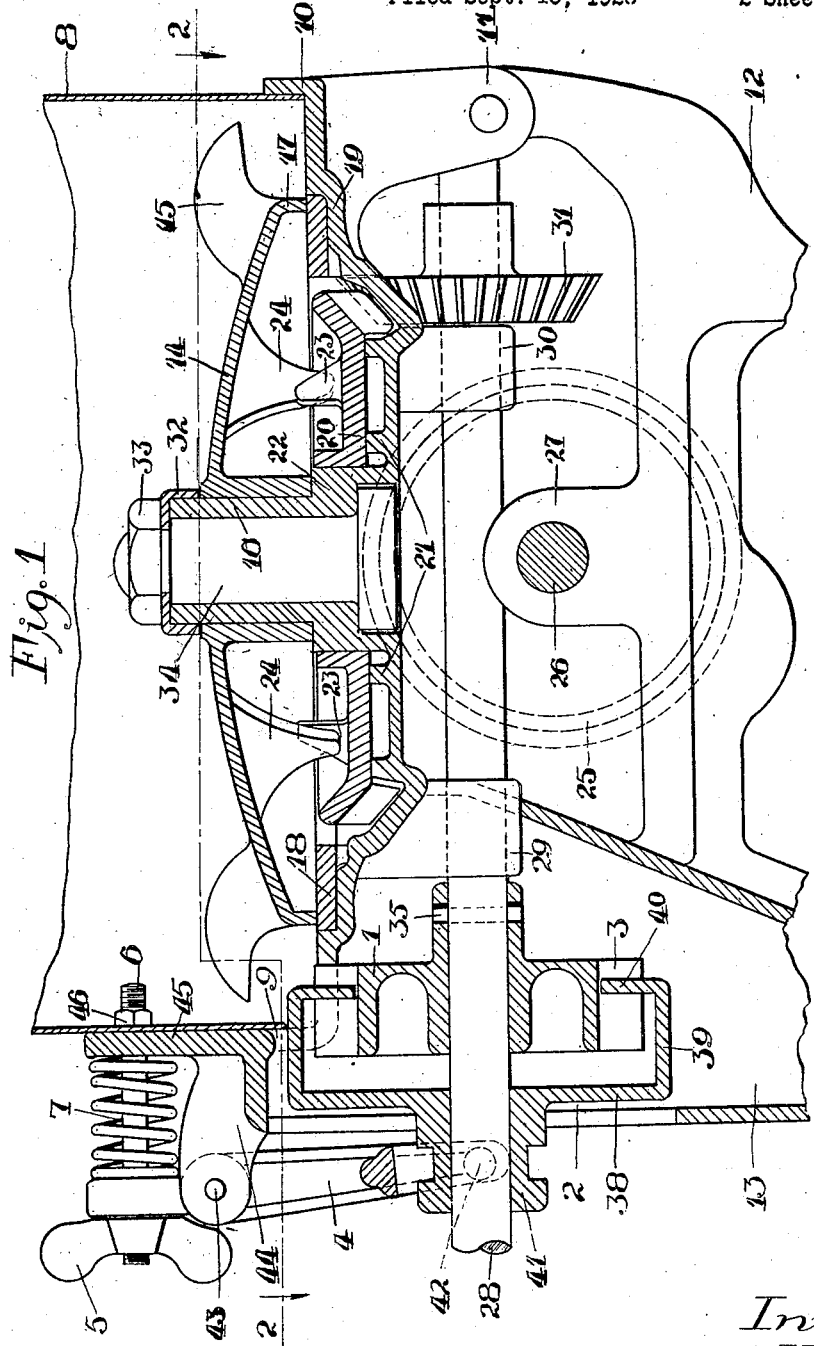

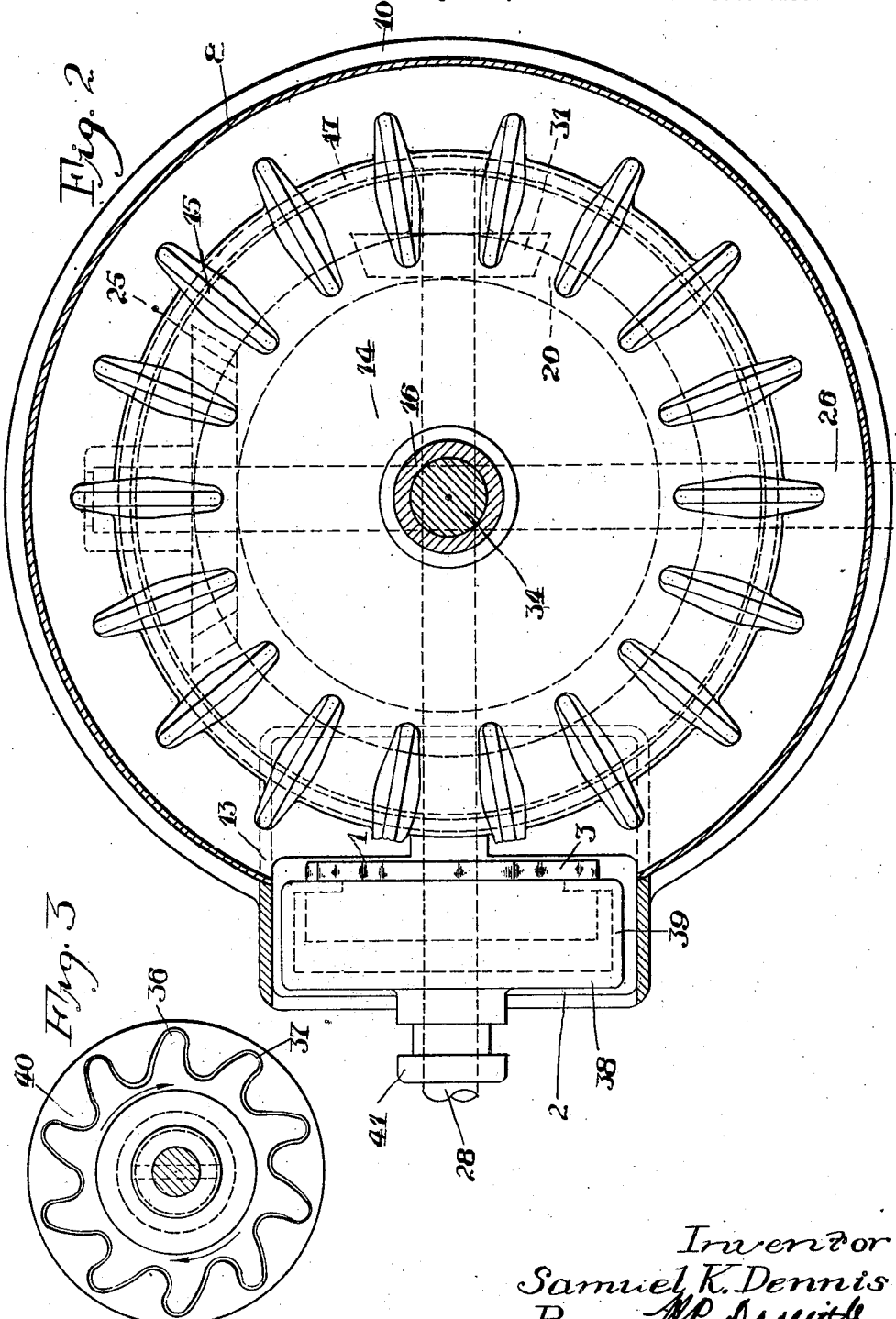

1,677,469

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

COTTON PLANTER.

Application filed September 13, 1926. Serial No. 134,997.

This invention pertains to hopper discharging mechanisms, the type of such mechanism shown in the accompanying drawings being a seed feeding device adapted for use in planting cotton-seed.

One object of the invention is to provide a novel and practical hopper discharging mechanism which eliminates the disadvantages of prior art mechanisms used for handling the same class of material. Such prior art mechanisms have produced poor results owing to the clogging of the material about the discharging element which has had its rate of discharge varied by a normally stationary feed regulator. This difficulty is avoided in the present mechanism by providing a novel feed regulator which preferably always rotates with the discharging element herein shown as a feed wheel.

A further object is to provide a feed wheel which will positively transfer material from a hopper without cutting or crushing it.

Another object is to provide a novel combination of feed wheel and feed regulator which are permanently interlocked so as to rotate in unison, the feed wheel being at the same time sliable relative to the feed wheel to accurately govern the rate of discharge of material from the hopper.

A further object is to provide a novel operating means for the feed regulator which prevents crushing of the material or clogging of the feed wheel by reason of the fact that it yieldingly holds the feed regulator in any desired position.

Referring to the accompanying drawings in which like reference characters indicate the parts described herein,—

Figure 1 is a vertical sectional view of the illustrative hopper discharging mechanism, showing particularly the novel feed wheel and feed regulator cooperating therewith;

Figure 2 is partially a plan view and partially a horizontal sectional view taken on the line 2—2 of Figure 1, showing the hopper discharging mechanism, the agitator and the feed regulator being shown in plan, and the casing for the feed wheel and feed regulator being shown in horizontal section; and Figure 3 is a detail elevation showing the picker wheel and indicating the manner in which it is combined with the feed regulator.

The illustrative hopper discharging mechanism herein shown as a seed feeding mechanism for cotton planters comprises a novel discharging element herein referred to as a feed wheel, or picker wheel 1. Cooperating with the picker wheel is a feed regulator 2 which preferably substantially encloses the picker wheel in one position of adjustment. The feed regulator is cup-shaped, as clearly shown in Figure 1 of the drawings, and is movable lengthwise of the teeth of the seed engaging portions 3 of the picker wheel.

For preventing the crushing of seed dispensed by the illustrative mechanism and for preventing the clogging of the discharging mechanism, the feed regulator 2 is preferably mounted so that it may yield under the influence of abnormal pressure caused by bunching of the seeds. The illustrative mechanism for changing the position of the feed regulator and for always holding it so that it may yield against such pressure includes a pivotally mounted fork 4 movable about its pivot by an operating means herein shown as a thumb screw 5 threaded upon an adjusting bolt 6. Movement of the operating means in one direction is always resisted by yielding means preferably comprising a spiral spring 7.

The above described mechanism has parts movable within a hopper 8 having a discharge outlet 9 at one side thereof. The hopper is preferably cylindrical and is provided with a base 10 shown as a casting pivoted at 11 upon a bracket 12 in which a seed boot or seed passageway 13 is provided. Within the hopper means is provided to agitate the seeds and to maintain a supply of the seeds at the outlet 9. This means is herein shown as an agitator 14 having radially extending projections 15 engaged well within the body of the seeds within the hopper. The agitator is rotatable upon a central stub 16 preferably constructed integrally with the base 10 of the hopper. The agitator is also formed with an annular bearing portion 17 normally resting upon a bearing ring or plate 18 held in place within the base of the hopper by reason of a depressed portion 19.

The driving connections for the agitator include a bevel gear 20 preferably rotatable upon upstanding bearing ribs 21 integrally formed with the base of the hopper. The bevel gear 20 rotates around a boss 22 shown as an enlarged portion of the stud 16. Operating lugs 23 extend upwardly from the bevel gear 20 and engage similar lugs 24 upon the agitator 14 so as to complete the driving connection between the bevel gear and the agitator.

The bevel gear 20 meshes with a driving pinion 25 shown in dotted lines in Figures 1 and 2. This bevel gear is fixed upon a drive shaft 26 mounted within bearing portions 27 herein shown as integral with the bracket 12. The shaft 26 may be driven by any suitable or preferred means.

In the illustrative seed feeding mechanism the picker wheel 1 is driven by a feed shaft 28 preferably mounted within depending bearing portions 29 and 30, which are herein shown as integral with the base plate of the hopper. The feed shaft 28 is caused to be rotated by a bevel pinion 31 which is mounted so as to mesh with the teeth of the bevel gear 20. As is well illustrated in Figure 1 of the drawings, the feed shaft 28 is located above the driving shaft 26 so that there will be no interference between the operating parts of the device.

For holding the agitator 14 at its operating position within the hopper and for preventing the escape of seeds centrally of the stud 16 a cap 32 is provided. This cap snugly fits upon the upper end of the stud 16 and its sides depend over the edges of the stud so as to rotatably engage the upper part of the agitator. For holding the cap 32 in place a nut 33 is provided adapted to be tightened upon the screw threaded portion of a bolt 34 extending upwardly through the stud 16.

The picker wheel 1 is non-rotatively fixed upon the feed shaft 28 by means of a pin 35. Beyond the picker wheel 1 the feed regulator is mounted so as to be slidable upon the shaft 28.

The illustrative picker wheel is fluted, as clearly indicated in Figure 3 of the drawings. This construction promotes the positive engagement with, and removal of, seeds from the hopper, the seeds engaging the picker wheel between its radial extensions which form the flutes and being positively removed from the hopper by engagement with the substantially radially extending walls of the flutes. For desirably promoting the positive removal of seeds from the hopper each flute 36 may be slightly curved in the direction of rotation of the picker wheel, as indicated in Figure 3 of the drawings. Cotton seeds are of such a character that they are positively discharged by such a picker wheel as that herein shown.

Crushing or cutting of the cotton seeds is prevented by constructing the flutes 36 of the picker wheel with rounded nose portions 37. These nose portions are moving substantially transversely of a supply of seeds while they are passing within the hopper outlet, and they would, therefore, have an undesirable crushing action, if formed with prominent edges.

Clogging of the discharging mechanism by reason of the bunching of seeds at the hopper outlet is substantially eliminated by the provision of the feed regulator 2 which rotates in unison with the feed wheel. This feed regulator is preferably cup-shaped so that it may substantially enclose the feed wheel, it being provided with a rear wall 38 and the circular wall 39 from the front edge of which inwardly extending teeth 40 project into the valleys of the fluted picker wheel. The feed regulator thus has inwardly extending scalloped portions snugly fitting the picker wheel, but sufficiently spaced therefrom so that the feed regulator may be easily moved toward or from the picker wheel.

In order that the feed regulator may be readily moved from one position to another, it is formed with a grooved hub 41 slidable upon the shaft 28. For sliding the feed regulator relative to the picker wheel the fork 4 is provided with trunnions 42 engaged within the groove in the hub 41. The fork 4 is preferably mounted upon a pivot pin 43 supported by a bracket 44 preferably integral with the base. The upper end of the fork 4 is provided with an opening so that the fork may move relative to the adjusting bolt 6 which is held within an upstanding rib 45 by means of a nut 46. On one side of the upper end of the fork 4 the thumb screw 5 is mounted. This constitutes means for moving the feed regulator away from the feed wheel so as to increase the rate of discharge of seeds from the hopper. The feed wheel is moved in this direction when the thumb screw is turned in a clockwise direction. The thumb screw is preferably screw threaded upon the bolt 6 so as to cause the above mentioned operation.

The movement of the upper end of the fork 4 toward the hopper so as to increase the rate of discharge of seeds therefrom is always resisted by a resilient element, herein shown as a coil spring 7. This arrangement of elements substantially eliminates clogging of the hopper discharging mechanism by reason of any abnormal bunching of the seeds at the outlet by the agitator.

The agitator 14 maintains a supply of seeds at the outlet and, during its operation, is constantly moving seeds at the outlet. Under such circumstances large groups of seeds are frequently moved at the same time. Cotton seeds are of such a character that they frequently collect in a matted mass from which it is difficult to separate the individual seeds. In case such a mass is moved by the agitator against the forward face of the feed regulator, the latter may yield and move outwardly of the hopper by reason of the provision of the spiral spring 7.

The bunching of seeds at the outlet of the hopper is also substantially diminished by the arrangement of elements above described, the seeds being much less inclined to bunch against a constantly moving element than against a fixed feed regulator.

Although the invention has been described with relation to a particular seed feeding mechanism, it is to be understood that the invention is not limited thereto, but that it is capable of use in various combinations and sub-combinations within the scope of the appended claims.

What is claimed as new is:

1. A seed feeding mechanism for cotton planters comprising, in combination, a hopper having an outlet at one side thereof, an agitator operable within the hopper to maintain a supply of seeds at the outlet, a picker wheel having peripheral seed engaging flutes movable through the hopper outlet, a feed regulator adapted to substantially enclose said picker wheel, and means for slidably moving the feed regulator so as to uncover or cover any desired proportion of seed engaging flutes.

2. A seed feeding mechanism for cotton planters comprising, in combination, a hopper having a discharge outlet, an agitator operable within the hopper to maintain a supply of seeds at the outlet, a fluted picker wheel rotatably mounted externally of the hopper and having its fluted seed engaging portions operable within the discharge outlet, and a feed regulator closely fitting the fluted portion of said picker wheel and slidable relative thereto so as to substantially enclose any desired part of the picker wheel.

3. A seed feeding mechanism for cotton planters comprising, in combination, a hopper having a discharge outlet, an agitator operable within the hopper to maintain a supply of seed at the outlet, a toothed picker wheel having seed engaging teeth the points of which are curved in the direction of rotation of the wheel, means for so mounting said picker wheel that the seed engaging teeth pass through the hopper outlet, a feed regulator movable with the picker wheel and so formed as to substantially enclose any desired part of the picker wheel, and means for sliding the feed regulator so as to uncover or cover more or less of the seed engaging teeth, said feed regulator being formed with an inwardly extending scalloped portion closely fitting the contour of the picker wheel.

4. A hopper discharging mechanism having a fluted feed wheel and a cup-shaped feed regulator movable axially relative to the feed wheel so as to cover or uncover more or less of the fluted portions of the feed wheel.

5. A seed feeding mechanism for cotton planters comprising, in combination, a toothed feed wheel having hooked teeth the ends of which are curved forwardly relative to the direction of movement of the teeth, and a cup-shaped feed regulator substantially enclosing portions of said teeth so as to vary the rate of discharge of material from the hopper.

6. A seed feeding mechanism for cotton planters comprising, in combination, an upright cylindrical hopper having a discharge outlet at one side, an agitator rotatable within the hopper to maintain a supply of seeds at the outlet, a toothed picker wheel having seed engaging teeth the points of which are curved forwardly in the direction of rotation of the wheel, means for so mounting the picker wheel that the seed engaging teeth pass through the hopper outlet in proximity to the outer parts of the agitator, a cup-shaped feed regulator adapted to substantially enclose the picker wheel, inwardly extending scalloped portions on the feed regulator closely fitting the toothed portions of the picker wheel, and means for sliding the feed regulator lengthwise of the teeth of the picker wheel so as to uncover or cover more or less of the seed engaging teeth.

7. A hopper discharging mechanism comprising, in combination, a hopper having an outlet at one side thereof, a material moving member operable within the hopper to keep the outlet supplied with material to be discharged, a picker wheel mounted on a shaft outside of the hopper and extending within the hopper so as to discharge seeds therefrom, and a yieldingly controlled feed regulator movable to uncover or cover any desired proportion of the seed engaging portion of the picker wheel.

8. A seed feeding mechanism for cotton planters comprising, in combination, a hopper having an outlet at one side thereof, an agitator operable within the hopper to keep the outlet supplied with seeds, a picker wheel rotatable within a passageway leading from the hopper and having seed engaging portions extending within the hopper, and a yielding feed regulator rotatable with said picker wheel and slidable relative thereto to uncover or cover any desired proportion of the seed engaging portions of the picker wheel.

9. A hopper discharging mechanism comprising, in combination, a hopper having an outlet, means for presenting material to said outlet, a material discharging device movable in said outlet to effect a regulated discharge of material from the hopper, a feed regulator movable in unison with the discharging device in normal operation, and yieldingly mounted operating means for slidably moving the feed regulator relative to the discharging device to vary the amount of material discharged by the latter.

10. A seed feeding mechanism for cotton planters comprising, in combination, a hopper having an outlet at one side thereof, an agitator operable within the hopper to maintain a supply of seeds at the outlet, a picker wheel having peripheral seed engaging flutes movable through the hopper outlet, a feed regulator adapted to substantially enclose said picker wheel, operating means for slidably moving the feed regulator so as to uncover or cover any desired proportion of seed engaging flutes, and a spring acting on the operating means to allow the feed regulator to yield under abnormal resistance.

11. A seed feeding mechanism for cotton planters comprising, in combination, a hopper having a discharge outlet, an agitator operable within the hopper to maintain a supply of seeds at the outlet, a fluted picker wheel rotatably mounted externally of the hopper and having its fluted seed engaging portions operable within the discharge outlet, and a spring held feed regulator closely fitting the fluted portion of said picker wheel and slidable relative thereto so as to substantially enclose any desired part of the picker wheel.

12. A seed feeding mechanism for cotton pickers comprising, in combination, a hopper having a discharge outlet, an agitator operable within the hopper to maintain a supply of seed at the outlet, a toothed picker wheel having seed engaging teeth the points of which are curved in the direction of rotation of the wheel, means for so mounting said picker wheel that the seed engaging teeth pass through the hopper outlet, a feed regulator movable with the picker wheel and so formed as to substantially enclose any desired part of the picker wheel, and spring resisted operating means for sliding the feed regulator so as to uncover or cover more or less of the seed engaging teeth, said feed regulator being formed with an inwardly extending scalloped portion closely fitting the contour of the picker wheel.

13. A hopper discharging mechanism having a fluted feed wheel, a cup-shaped feed regulator movable axially relative to the feed wheel so as to cover or uncover more or less of the fluted portions of the feed wheel, and a spring resisting such movements in one direction.

14. A hopper having a discharge outlet, an agitator rotatable within the hopper to maintain a supply of seeds at the outlet, a fluted picker wheel having its fluted portion movable within the outlet, means for mounting the picker wheel so that it will rotate on an axis substantially at right angles to the axis of rotation of the agitator, and a yieldingly controlled feed regulator rotatable with the picker wheel to vary the extent of the fluted portions of the wheel which are active to discharge material from the hopper.

15. A seed feeding mechanism for cotton planters comprising, in combination, a toothed feed wheel having hooked teeth the ends of which are curved forwardly relative to the direction of movement of the teeth, a cup-shaped feed regulator substantially enclosing portions of said teeth so as to vary the rate of discharge of material from the hopper, and spring resisted operating means for moving the feed regulator.

16. A seed feeding mechanism for cotton planters comprising, in combination, an upright cylindrical hopper having a discharge outlet at one side, an agitator rotatable within the hopper to maintain a supply of seeds at the outlet, a toothed picker wheel having seed engaging teeth the points of which are curved forwardly in the direction of rotation of the wheel, means for so mounting the picker wheel that the seed engaging teeth pass through the hopper outlet in proximity to the outer parts of the agitator, a cup-shaped feed regulator adapted to substantially enclose the picker wheel, inwardly extending scalloped portions on the feed regulator closely fitting the toothed portions of the picker wheel, and spring resisted operating means for sliding the feed regulator lengthwise of the teeth of the picker wheel so as to uncover or cover more or less of the seed engaging teeth.

17. A seed feeding mechanism for cotton planters comprising, in combination, a hopper having a discharge outlet at one side, an agitator rotatable upon a vertical axis within the hopper for moving seeds toward the outlet, a picker wheel rotatable through the discharge outlet, a feed regulator extending within the outlet and mounted so as to oppose an abnormal movement of seeds toward the outlet, and means for yieldingly controlling the movements of the feed regulator so that it may yield under undue pressure.

18. A seed feeding mechanism for cotton planters comprising, in combination, a fluted feed wheel, a feed regulator cooperating with the feed wheel, and a spring for yieldingly holding the feed regulator in any desired position but allowing the feed regulator to yield under abnormal pressure due to bunching of the seeds.

19. A seed feeding mechanism for cotton planters comprising, in combination, a hopper having an outlet at one side, means for moving material toward the outlet, a seed feeding wheel rotatable in the outlet, a feed regulator, and means for yieldingly holding the feed regulator in any desired position so that it may prevent the crushing of the seeds and clogging of the feeding mechanism when an abnormal quantity of seeds are forced toward the outlet.

20. A seed feeding mechanism for cotton planters comprising, in combination, a hopper having an outlet, an agitator movable within the hopper so as to maintain a supply of seeds at the outlet, a picker wheel having seed engaging parts passing through the outlet, a cup-shaped feed regulator adapted to substantially enclose any desired part of the picker wheel, a pivotally mounted fork for moving the feed regulator relative to the picker wheel, means for acting upon the fork to change the position of the feed regulator, and yielding means for resisting the movement of the fork in one direction.

21. A seed feeding mechanism for cotton planters comprising, in combination, a feed wheel, a feed regulator cooperating with the feed wheel, operating means for changing the position of the feed regulator, and means for yieldingly resisting movement of the operating means and the feed regulator in one direction.

In testimony whereof I affix my signature.

SAMUEL K. DENNIS.